United States Patent Office 2,760,885
Patented Aug. 28, 1956

2,760,885

PROCESS FOR BONDING HYDRAULIC CEMENTITIOUS MATERIALS

Herbert J. Larsen, deceased, late of Washington, D. C., by Phyllis H. Larsen, administratrix, Washington, D. C., and George G. Groome, Takoma Park, Md., assignors, by mesne assignments, to said Phyllis H. Larsen, Washington, D. C.

No Drawing. Application April 14, 1954,
Serial No. 423,236

8 Claims. (Cl. 117—70)

This invention relates to a process for bonding hydraulic cementitious materials to base materials and more particularly, to a method of plastering whereby cementitious materials such as Portland cement or gypsum plaster may be firmly bonded to any base structure such as, for example, concrete block, cinder block, wood, brick, "rock lath," and monolithic concrete slabs. The invention is further directed to the laminated structure resulting from the use of the method of plastering described herein.

The problem of applying hydraulic cementitious materials as a surfacing agent to wood, cinder block, monolithic concrete and the like is a difficult one, and none of the solutions hitherto suggested have been entirely satisfactory. It is well known, for example, that one cannot successfully apply a coating or layer of a finishing coat of cement to a set concrete base because the finishing coat cracks and does not form a firm, permanent bond between the concrete base and the applied coating. Nor is it possible to apply coatings or layers of such cementitious materials to other kinds of base materials, such as wood, metal, glass and the like. In fact, much of the new building in this country is composed of poured, smooth monolithic slab concrete and no practical way is now available for applying plaster finish coats to such materials. Consequently, most of the finish coats for wall surfaces and the like are painting jobs, and the rough cast flooring has been surfaced with asphalt tile for appearance.

Thus, the problem of developing a process for surfacing base structural materials of the kind stated with plasters such as lime-gypsum materials, fine finish coatings of Portland cement, and the like, is a very real one in this art. The method most commonly used heretofore is that of applying an adhesive coating to the base material which coating is in the nature of an asphalt emulsion. Over this adhesive coating is applied the plaster. It is necessary to apply the plaster immediately after application of the adhesive coating since the action depends upon the tack qualities of the adhesive. In the coarse of time such finish coatings applied according to that process crack and craze because of the deterioration of the underlying film of asphalt, a material notoriously susceptible to oxidation, temperature changes, and internal break-down of the constituents thereof.

The present invention is directed to the method of applying plaster whereby the plaster is interlocked with the base material through the intermediary of the bonding agent. It can be readily seen that by virtue of this interlocking effect obtained according to the method herein disclosed results are possible which were not realized by prior art processes wherein the plaster was, in effect, glued to the base material.

The presently described process contemplates the use of a novel bonding agent described and claimed in applicants' co-pending application, Serial No. 281,914, filed April 11, 1952, for "Bonding Adhesives, Particularly for Bonding Hydraulic Cementitious Materials," now abandoned. This bonding agent is an aqueous emulsion of the polyvinyl acetate resins which are compounded with additional agents to produce the bonding material suitable for use in the presently described process.

One of the outstanding features of the present invention is the use of a special bonding agent which permits the plaster to be applied at any time after the application of the bonding agent to the base material even if the bonding agent has dried out. In methods employed heretofore it was essential to apply the plaster immediately after the application of the asphalt emulsion for, in the event that the asphalt dried, it was completely ineffectual in gluing the finish coat to the base material.

It has now been discovered that polyvinyl acetate emulsions have remarkable properties for use as bonding agents in the practice of our invention. These emulsions do not oxidize as do the asphalt emulsions. Moreover, the deposited solids of these emulsions readily re-emulsify when brought into contact with water, as, for example, when wet gypsum plaster is applied to a base structure covered with such deposited solids, essentially polyvinyl acetate.

While the invention embraces broadly the use of such polyvinyl acetate emulsions and, as such, is entirely operative, it has been found that the addition of plasticizers and the like is beneficial.

One bonding agent found suitable for use in the present invention is an emulsion of polyvinyl acetate resin with the addition of plasticizing agents including polychlorinated diphenyl, tricresyl phosphate, and hexylene glycol.

One suitable composition is composed of about 100 parts by weight of the commercial polyvinyl acetate emulsion (55 to 60% solids) 8 parts by weight of the polychlorinated diphenyl (Arachlor), 8 parts by weight of tricresyl phosphate, and 2 parts by weight of hexylene glycol dissolved in 5 parts by weight of water. In formulating this mixture, it is preferred to first admix the polychlorinated diphenyl and tricresyl phosphate together at a slightly raised temperature, about 100–110° F. to blend these two materials thoroughly together after which the mixture is added to the polyvinyl acetate emulsion with stirring. Thereafter the hexylene glycol, admixed with the amount of water stated above is stirred into the aqueous emulsion and the entire mixture agitated for about an hour at fairly low speeds, of the order of 400 R. P. M. Too rapid agitation may result in a breakdown of the emulsion at this stage. The agitation, of course, depends upon such factors as the type of agitator used, and quantities being blended together. The agitation is simply for the purpose of rendering the mixture homogeneous.

Variations can be made in the amounts of ingredients stated above. It has been found that for best results the polychlorinated diphenyl and tricresyl phosphate should be used in about equal amounts and these can vary from about 4 to 12 parts by weight of each to 108 parts by weight of the base polyvinyl acetate emulsion. Less than 4 parts by weight of each tends to render the deposited and dried films somewhat brittle, and more than about 12 parts by weight tends to make the films a bit too soft so that cold flow could occasionally occur.

The method of applying plaster according to the present invention is as follows: The base material which may be any of the building materials presently used need not be prepared in any way and may, in fact, be either damp or dry when the bonding agent is applied. The bonding agent is then sprayed or brushed over the base surface to be covered and forms a film thereon. The hydraulic cementitious material, such as Portland cement or gypsum plaster, is then applied over the film. The plastering may be delayed for any desired length of time after applying the film of bonding agent. This is due to the fact that a film of bonding agent itself is redispersible and will re-emulsify after having dried out. As the laminated structure dries it is possible that crystals of gypsum in the plaster "fall in" the emulsion of the bonding agent and the plastic particles in the bonding agent draw together until a barrier is formed. Similarly, the particles in the emulsion of the bonding agent fill the pores in the base material. Thus, it can be seen that an interlocking is obtained between the finish coat and the base which effect is not contemplated by any of the prior art methods.

However, while it is believed the enhanced adhesiveness is due to this "interlocking" of plaster and emulsion film, the invention is not to be limited to this theory.

As stated above, the bonding agent may consist simply of the commercially available polyvinyl acetate emulsions. Advantageously, however, plasticizers such as those referred to above are also present.

While the utility of this invention in bonding base structural materials such as concrete slabs, wood, and steel to finish coatings of hydraulic cementitious materials has been emphasized, it is obvious that the presently described process is applicable in other fields as well, for example, in bonding wood to wood.

What is claimed is:

1. A laminated structure comprising a base material, a coating thereon comprising a film composed of the solids deposited from an aqueous emulsion of a polyvinyl acetate, said solids being re-emulsifiable, and a set hydraulic cementitious material overlying and adhering to said coating.

2. An adhesive composition comprising about 100 parts by weight of an aqueous emulsion of a polyvinyl acetate resin, about 4 to 12 parts by weight of a polychlorinated diphenyl, about 4 to 12 parts by weight of tricresyl phosphate and about 2 parts by weight of hexylene glycol, said composition, when applied as a coating and allowed to dry, yielding a water permeable film.

3. An adhesive composition comprising about 100 parts by weight of an aqueous emulsion of a polyvinyl acetate resin, about 8 parts by weight of a polychlorinated diphenyl, about 8 parts by weight of tricresyl phosphate, and about 2 parts by weight of hexylene glycol, said composition, when applied as a coating and allowed to dry, yielding a water permeable film.

4. The process of applying a hydraulic cementitious material which comprises coating a base material with a film of aqueous emulsion of resin the deposited solids of which will re-emulsify in contact with water, the aqueous emulsion of resin comprising about 100 parts by weight of an aqueous emulsion of a polyvinyl acetate resin, about 8 parts by weight of a polychlorinated diphenyl, about 8 parts by weight of tricresyl phosphate, and about 2 parts by weight of hexylene glycol, drying the film, and re-emulsifying the film by applying an aqueous mixture of hydraulic cementitious material thereto.

5. The process of applying a hydraulic cementitious material which comprises coating a base material with a film of an aqueous emulsion of polyvinyl acetate the deposited solids of which will re-emulsify in contact with water, drying the film, and thereafter re-emulsifying the polyvinyl-acetate film by applying an aqueous mixture of hydraulic cementitious material thereto.

6. In a process for applying a hydraulic cementitious material to a base material comprising the steps of coating the base material with a film composed essentially of an aqueous emulsion of polyvinyl acetate, the deposited solids of which will re-emulsify in contact with water, drying the film, and thereafter re-emulsifying the polyvinyl acetate film by applying the hydraulic cementitious material.

7. The process of applying a hydraulic cementitious material comprising coating a base material with a film of an aqueous emulsion of polyvinyl acetate and hexylene glycol the deposited solids of which will re-emulsify in contact with water, permitting the film to dry, and thereafter re-emulsifying the polyvinyl acetate film by applying an aqueous mixture of hydraulic cementitious material thereto.

8. The process of applying a hydraulic cementitious material which comprises coating a base material with a film of an aqueous emulsion of polyvinyl acetate, hexylene glycol and tricresyl phosphate, the deposited solids of which will re-emulsify in contact with water, drying the film, re-emulsifying the polyvinyl acetate film by applying an aqueous mixture of hydraulic cementitious material thereto.

References Cited in the file of this patent

UNITED STATES PATENTS

| | | |
|---|---|---|
| 1,978,807 | Merritt | Oct. 30, 1934 |
| 2,422,665 | Fredrickson et al. | June 24, 1947 |
| 2,595,952 | Kunze et al. | May 6, 1952 |
| 2,644,771 | Kempthorne | July 7, 1953 |
| 2,662,863 | Bristol | Dec. 15, 1953 |

FOREIGN PATENTS

| | | |
|---|---|---|
| 523,349 | Great Britain | July 12, 1940 |